(12) United States Patent
Liang

(10) Patent No.: US 6,912,199 B1
(45) Date of Patent: Jun. 28, 2005

(54) METHOD TO SELECT TRANSMISSION RATE FOR NETWORK DEVICE

(75) Inventor: Chin-Wei Liang, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 791 days.

(21) Appl. No.: 09/750,878

(22) Filed: Dec. 28, 2000

(51) Int. Cl.⁷ .............................................. H04L 12/26
(52) U.S. Cl. .................... 370/236; 370/235; 370/236.1; 370/352; 370/392; 370/465
(58) Field of Search .............................. 370/236, 236.1, 370/352, 392, 465, 235, 292, 253, 255, 229

(56) References Cited

U.S. PATENT DOCUMENTS

| | | | |
|---|---|---|---|
| 4,823,338 A | | 4/1989 | Chan et al. |
| 5,768,271 A | | 6/1998 | Seid et al. |
| 5,784,573 A | | 7/1998 | Szczepanek et al. |
| 5,959,990 A | | 9/1999 | Frantz et al. |
| 5,978,378 A | | 11/1999 | Van Seters et al. |
| 5,995,488 A | | 11/1999 | Kalkunte et al. |
| 6,016,318 A | | 1/2000 | Tomoike |
| 6,041,358 A | | 3/2000 | Huang et al. |
| 6,046,979 A | * | 4/2000 | Bauman ..................... 370/229 |
| 6,067,585 A | | 5/2000 | Hoang |
| 6,075,776 A | | 6/2000 | Tanimoto et al. |
| 6,085,238 A | | 7/2000 | Yuasa et al. |
| 6,094,436 A | | 7/2000 | Runaldue et al. |
| 6,597,662 B1 | * | 7/2003 | Kumar et al. ............... 370/236 |
| 6,665,273 B1 | * | 12/2003 | Goguen et al. ............. 370/252 |
| 2002/0041570 A1 | * | 4/2002 | Ptasinski et al. ............ 370/252 |
| 2002/0097684 A1 | * | 7/2002 | Das et al. .................... 370/252 |

OTHER PUBLICATIONS

U.S. Appl. No. 60/196,002.*
U.S. Appl. No. 60/197,224.*
AMD. "AM79C901 HomePHY (Single–Chip 1/10 Mbps Home Networking PHY)." URL: http://www.amd.com/products/npd/overview/homenetworking/22334.html.

Frank, Edward and Holloway, Jack. "Connecting the Home with a Phone Line Network Chip Set." Broadcom Corporation. IEEE MICRO Mar.–Apr. 2000: 27–38.

Claims for U.S. Appl. No. 09/715,443.
Claims for U.S. Appl. No. 09/715,997.
Claims for U.S. Appl. No. 09/716,854.
Claims for U.S. Appl. No. 09/769,982.
Claims for U.S. Appl. No. 09/769,890.
Claims for U.S. Appl. No. 09/770,060.
Claims for U.S. Appl. No. 09/774,292.
Claims for U.S. Appl. No. 09/776,195.
Claims for U.S. Appl. No. 09/776,339.

* cited by examiner

Primary Examiner—Steven Nguyen
Assistant Examiner—Clemence Han
(74) Attorney, Agent, or Firm—Renner, Otto, Boisselle & Sklar, LLP

(57) ABSTRACT

A network node has multiple physical layer devices (PHYs), multiple media access controllers, and means for gathering and utilizing information regarding the capabilities of other nodes on the network. The node capability information may be gathered using hardware or software, and may involve gathering information from data frames received by the node, and/or from capability and status announcement frames received by the node. Hardware means for gathering the node capability information may include a receive processing block and/or a node discovery block, which examine all or portions of received frames, and which include a look-up table for storing and receiving information such as desired transmission rates for frames sent to other nodes. The PHYs of the interface in an exemplary embodiment are able to transmit and receive data frames or packets which are in accordance with different home phoneline networking alliance (HPNA) specifications, for example, HPNA 1.0 and HPNA 2.0.

13 Claims, 7 Drawing Sheets

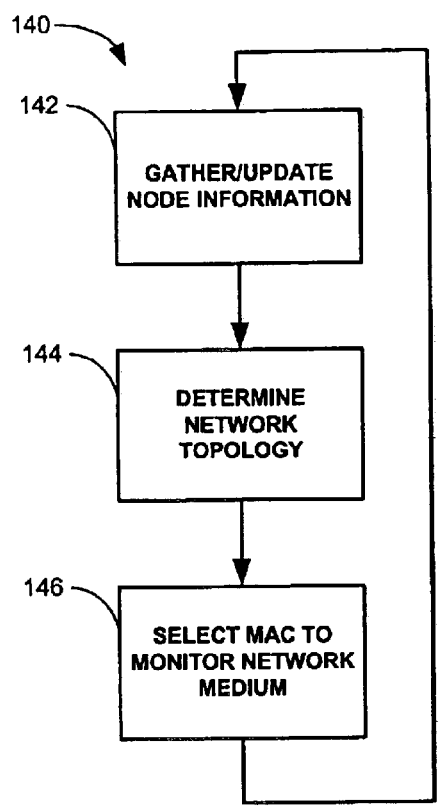 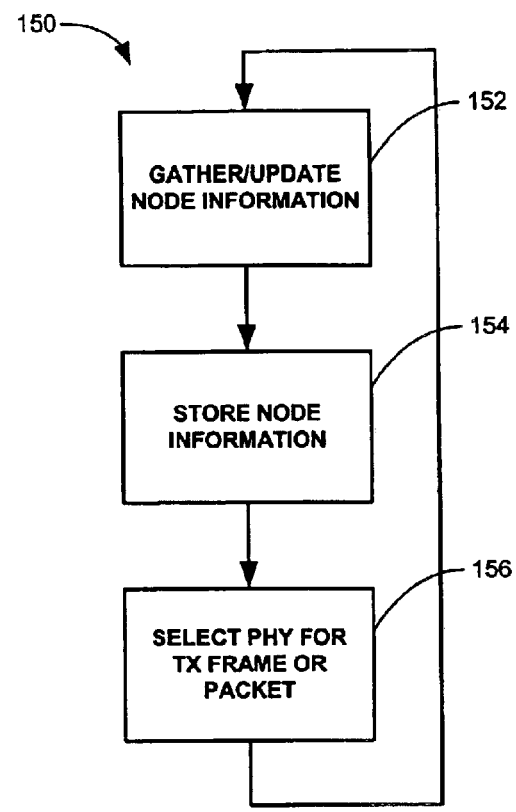
FIG. 5
FIG. 6

| ADDRESS | DESIRABLE TRANSMISSION RATE |
|---------|------------------------------|
| XXXXX | XXXX |
| XXXXX | XXXX |
| XXXXX | XXXX |
| XXXXX | XXXX |
| XXXXX | XXXX |
| XXXXX | XXXX |

METHOD TO SELECT TRANSMISSION RATE FOR NETWORK DEVICE

BACKGROUND OF THE INVENTION

1. Technical Field

The invention relates to the field of devices for interfacing with a network medium, and method for determining and utilizing information regarding other nodes of the network.

2. Description of the Related Art

Network interfaces for connecting a node, for example including a computer, to a network, commonly include a physical layer device (PHY), which handles the actual transmission and reception of signals on the network medium.

It may be desirable to include multiple PHYs in a network interface, with the PHYs having different operating characteristics, for example sending differently-formatted frames of frames with different protocols, depending on the capabilities of the intended receiving node of the network. Accordingly, it may be desirable for the network interface to include multiple media access controllers (MACs), to monitor and control access to the network medium. The MACs may correspond to the different operating protocols that the PHYs are capable of providing.

It would be desirable to have means at a network node for gathering and utilizing information about the capabilities of other nodes on the network, in order to control selection of an active PHY from among the PHYs, to control selection of an active MAC from among the MACs, and/or to select the transmission rate or other characteristics of transmissions from the node.

SUMMARY OF THE INVENTION

A network node has multiple physical layer devices (PHYs), multiple media access controllers (MACs), and means for gathering and utilizing information regarding the capabilities of other nodes on the network. The node capability information may be gathered using hardware or software, and may involve gathering information from data frames received by the node, and/or from capability and status announcement frames received by the node. Hardware means for gathering the node capability information may include a receive processing block and/or a node discovery block, which examine all or portions of received frames, and which includes a look-up table for storing and receiving information such as desired transmission rates for other nodes to which frames may be transmitted. The PHYs of the interface in an exemplary embodiment are able to transmit and receive data frames or packets which are in accordance with different home phoneline networking alliance (HPNA) specifications, for example, HPNA 1.0 and HPNA 2.0.

According to an aspect of the invention, a method of setting a sending transmit rate for transmitting an outgoing data frame from a network node along a network which includes telephone wiring as a network medium, includes the steps of 1) receiving incoming frames from the other nodes; 2) extracting, from each of at least some of the incoming frames, both a source node address corresponding to a source node of the frame, and between the network node and the source node; 3) storing, in a storage device at the network node, a look-up table with multiple entries, each of the entries including a desirable transmission rate and a corresponding node address, wherein the storing includes storing the source node addresses and the desirable transmission rates extracted from each of the at least some of the incoming frames; and 4) determining the sending transmit rate for an outgoing frame sent to a destination node having a outgoing frame destination address. The determining the sending transmit rate for the outgoing frame includes a) comparing the outgoing frame destination address to the node addresses stored in the storage device to determine whether a corresponding entry exists in the storage device which corresponds to the outgoing frame destination node; and b) if the corresponding entry exists, setting the sending transmit rate equal to the desirable transmission rate of the entry.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings:

FIGS. 5 and 6 are high-level flow charts of methods for obtaining and utilizing node capability information, using the interface device of FIG. 1 and/or software in the node configuration of FIG. 3;

FIG. 10 is a illustration of a look-up table used in the method of FIG. 9.

DETAILED DESCRIPTION

As described below, a network medium interface device includes a pair of physical layer devices (PHYs) for transmitting and receiving signals on a network medium, and a pair of media access controllers (MACs) for monitoring the network medium and controlling transmissions on the network medium. The PHYs are used to transmit and receive frames or packets in accordance with respective, different standards or specifications. Depending on the capabilities of the network nodes to send and receive frames or packets in one or both of the specifications, one or the other of the MACs is selected to monitor the network medium and control access to the network medium. Thus information on the capabilities and activities of other nodes on the network may be gathered, via hardware or software. This node capability information may be used to determine the "topology" of the network, which in turn may be used to determine which of the MACs is used to monitor the network medium. The node capability information may also be used to determine which of the PHYs should be used to transmit a particular data frame or packet to an intended destination node.

Figure 1:
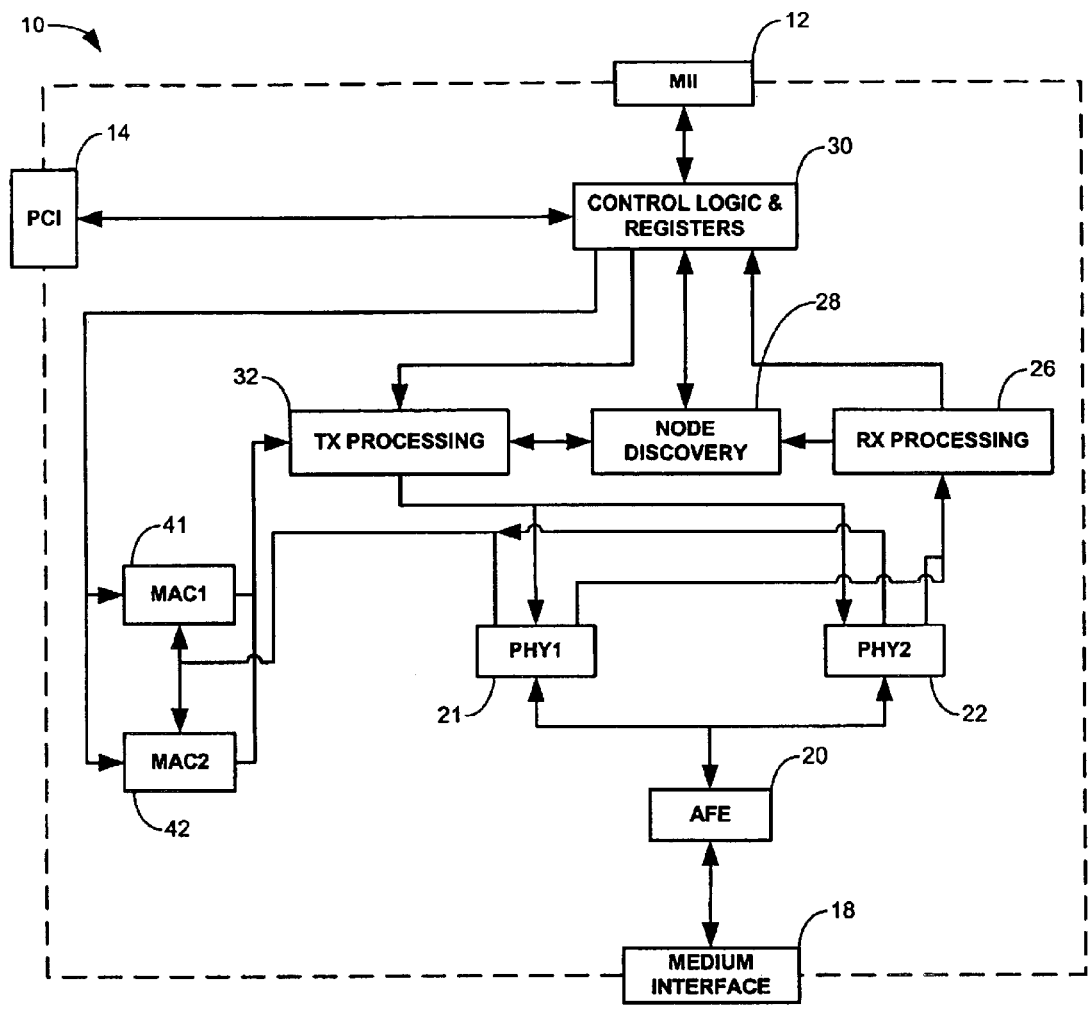
FIG. 1 is a block diagram of a network medium interface device in accordance with the present invention.

FIG. 1 shows a conceptual diagram of a multi-PHY, multi-MAC network medium interface device 10 used for coupling higher-level blocks of a network node, such as in a computer or other networked device, to a network medium. The interface device 10 includes a pair of higher-level interfaces for interfacing with the higher-level blocks, such as a medium independent interface (MII) 12 and a peripheral component interconnect (PCI) 14. The interface device 10 also has an interface, such as interface magnetics 18, for coupling to the network medium. An analog front end 20 is coupled to the interface magnetics 18. The analog front end 20 is also coupled to a pair of physical layer devices (PHYs), a first PHY 21 and a second PHY 22. The PHYs 21 and 22 handle transmission to and receipt of data from the network medium.

Data received by the PHYs 21 and 22 from the network medium is passed along to a receive processing block 26. The receive processing block 26 may include well-known devices such as state machines and FIFOs, and may perform functions such as assembling and/or reformatting frames or packets of data received, performing error checks on the frames, compiling and appending data to the frames or packets, and stripping unnecessary bits from the received frames or packets. As explained in greater detail below, the receive processing block 26 may send data and/or information to a node discovery block 28, which may obtain, retain, and communicate node capability information and/or network topology information. The node discovery block 28 may include an electronically-readable storage device, such as a cache, for storing information regarding various nodes of the network, for example information regarding the capabilities of the nodes.

From the receive processing block 26, the incoming data is passed to a control logic and registers block 30, which may store and/or further-process the incoming data. The control block 30 may include such devices as data registers, SRAMs, state machines, FIFOs, and/or various logic devices. The control block passes the received data to higher-level devices via the MII 12 and/or the PCI 14.

A transmit processing block 32 is coupled to the control block 30 for handling data to be transmitted on the network medium. The transmit processing block 32 may include devices such as state machines, FIFOs, and routing blocks. The data to be transmitted may be data generated from the MII 12. Alternatively, the transmitted data may be generated by the interface device 10 itself, such as by the control block 30. For instance, the interface device 10 may generate frames or packets, or may otherwise send data, regarding its capabilities, indicating its presence on the network, confirming successful receipt of data sent by another node, and/or requesting retransmission of frames or packets previously sent by another node on the network.

The transmit processing block 32 is operatively coupled to the PHYs 21 and 22 to pass data for transmission on the network medium. From the PHYs 21 and 22 the data to be transmitted passes through the analog front end 20 and the interface magnetics 18, to be transmitted along the network medium.

The PHYs 21 and 22 may be configured to send (transmit) frames or packets utilizing different specifications, for example, using different formats, protocols, or at different rates. In a particular exemplary embodiment, the interface device 10 is configured to interface with a network medium which includes wiring for telephone lines. The PHYs 21 and 22 in the particular embodiment are configured for communicating in accordance with different home phoneline networking alliance (HPNA) specifications. For example, the first PHY 21 may be configured to communicate in accordance with the HPNA 1.0 specification, and the second PHY 22 may be configured to communicate in accordance with the HPNA 2.0 specification. The HPNA 1.0 and 1.0 specifications are hereby incorporated by reference in their entireties.

The PHYs 21 and 22 may have different operating characteristics from each other. For example, the PHYs 21 and 22 may be configured to operate at different frequencies. The first PHY 21 may be a variable-frequency PHY 21 which is operatively configured to operate within a range of frequencies. The second PHY 22 may be a fixed-frequency PHY, configured to operate at a fixed frequency, which for instance, may be outside the range of frequencies at which the first PHY 21 operates. It will be appreciated that the PHYs 21 and 22 alternatively may be otherwise configured with respect to their frequencies of operation. For example, the PHYs 21 and 22 may both be fixed-frequency PHYs, but operating at different frequencies. As another example, the PHYs 21 and 22 may both be variable-frequency PHYs, but with different ranges of frequency, the ranges either being non-overlapping or partially overlapping. Further, it will be appreciated that the PHYs 21 and 22 may alternatively or in addition have different operating characteristics not directly related to frequency. The interface between the PHYs 21 and 22 and the processing blocks 26 and 32 may include means for synchronizing the data transfer to take into account the different operating characteristics of the PHYs.

As explained further below, the transmit processing block 32 is operatively coupled to the node discovery block 28. The transmit processing block 32 may send queries to the node discovery block 28 regarding the capabilities of the destination node to which a frame or packet is to be transmitted. The node discovery block 28 may respond with an indication of which of the PHYs 21 and 22 is to be used in transmitting a frame to the indicated destination node.

First and second MACs 41 and 42 are used to monitor the network medium for activity, such as transmissions by other nodes on the network, and to control the timing of transmission by the interface device 10, in order to minimize collisions on the network medium. The PHYs 21 and 22 may be coupled to the MACs 41 and 42 to provide the MACs with information regarding activity on the network medium. For example, one or both of the PHYs 21 and 22 may send or otherwise assert a signal, such as a carrier receive signal (CRS), when data is being received by the PHYs from the network medium. In addition, the PHYs 21 and 22 may send respective collision signals to the MACs 41 and 42 when a collision is detected during transmission of a frame.

The MACs 41 and 42 are operatively coupled to the transmit processing block 32 to control the transmit processing block. The,MACs 41 and 42 may control timing, of transmissions by the interface device 10 along the network medium by controlling when the transmit processing block 32 forwards data to the PHYs 21 and 22. The timing of transmissions may be selected, for example, based on availability of the network medium (thus avoiding collisions on the medium) and on the priority of the frame to be transmitted.

Depending on the topology of the network (the capabilities of the various nodes), either the first MAC 41 or the second MAC 42 is used to monitor the network medium and control transmission of frames thereupon. For example, if all of the nodes of the network are able to operate with enhanced capabilities (e.g., sending frames with various priority levels), one of the MACs may be active (used to monitor the network medium and control transmission of frames). The active MAC in such a case is the MAC which is able to handle the enhanced capabilities. The other MAC (not configured to take advantage of the enhanced capabilities) may be the active MAC when the network includes nodes that do not operate with the enhanced capabilities (a "mixed network" topology).

The information gathered and stored by the node discovery block 28 may be used in selecting which of the MACs 41 and 42 is the active MAC. As described in greater detail below, the node discovery block 28 may provide an indication that the network has a mixed network topology. The detection of a mixed network topology may result in the node discovery block 28 sending a signal to the control block 30 to write a bit to a data register, indicating a mixed network topology. The presence or absence of a bit in the register of the control block 30 may be used by the control block to send an enable or disable signal to one of the MACs 41 and 42. It will be appreciated that other means may be used to enable or disable one of the MACs 41 and 42 based on a network topology detected by the node discovery block 28.

Figure 2:
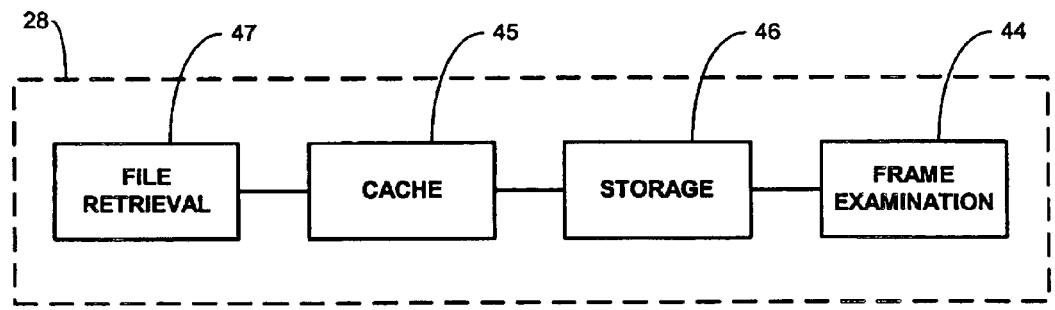
FIG. 2 is a block diagram of a node discovery block of the interface device of FIG. 1.

Referring now to FIG. 2, the node discovery block 28 has a number of functional sub-blocks for carrying out various functions, including a frame examination sub-block 44 for examining frames or portions of frames received from the receive processing block 26, extracting node capability information from the received frames or portion, and determining whether the node capability information from the received frame is to be stored in a cache 45 of the node discovery block; a storage sub-block 46 for handling storage of node capability information in the cache 45; and a retrieval sub-block 47 for retrieving node capability information from the cache 45 in response to queries from the transmit processing block 32.

Figure 3:
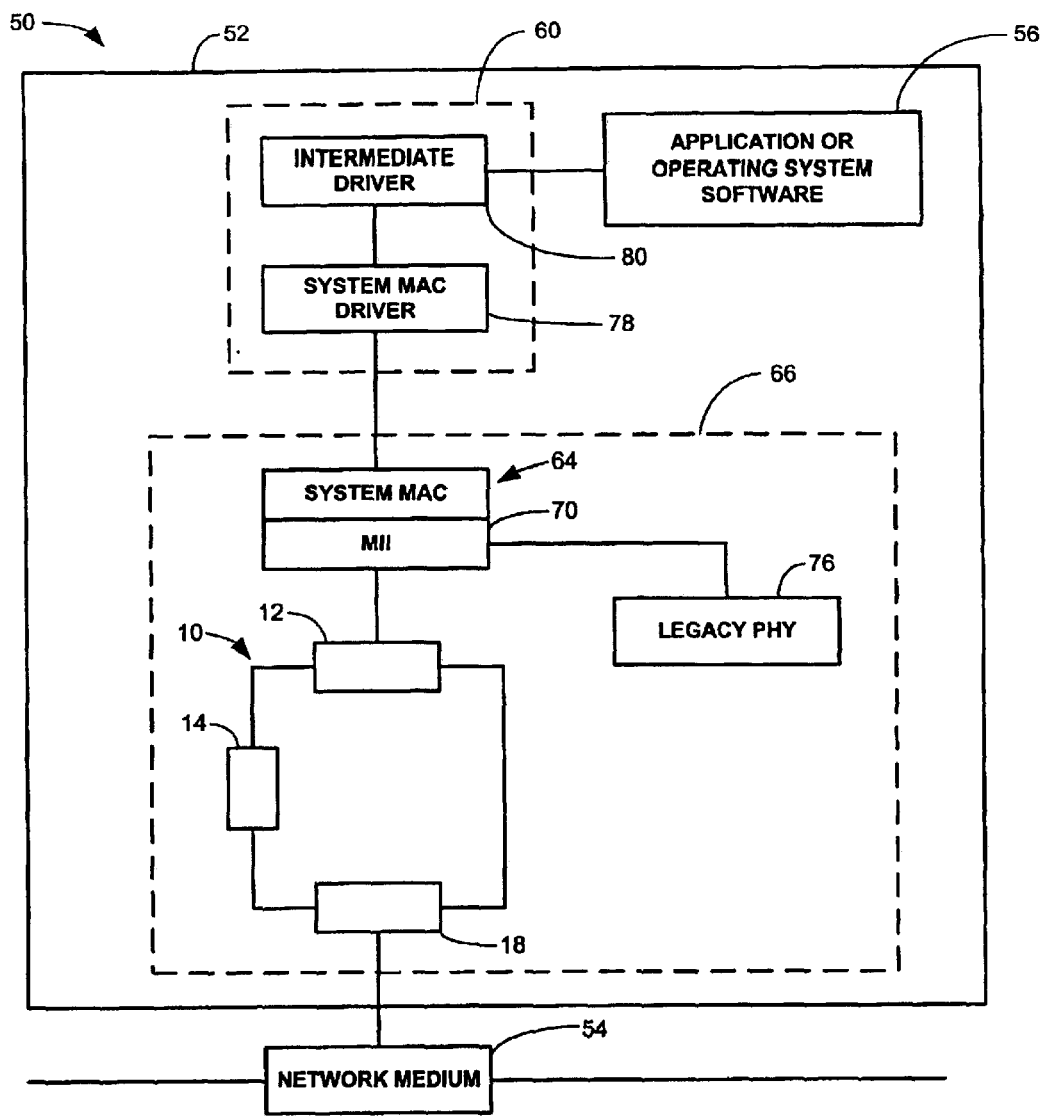
FIGS. 3 and 4 are block diagrams of the interface device of FIG. 1 as part of network node configurations.
Figure 4:
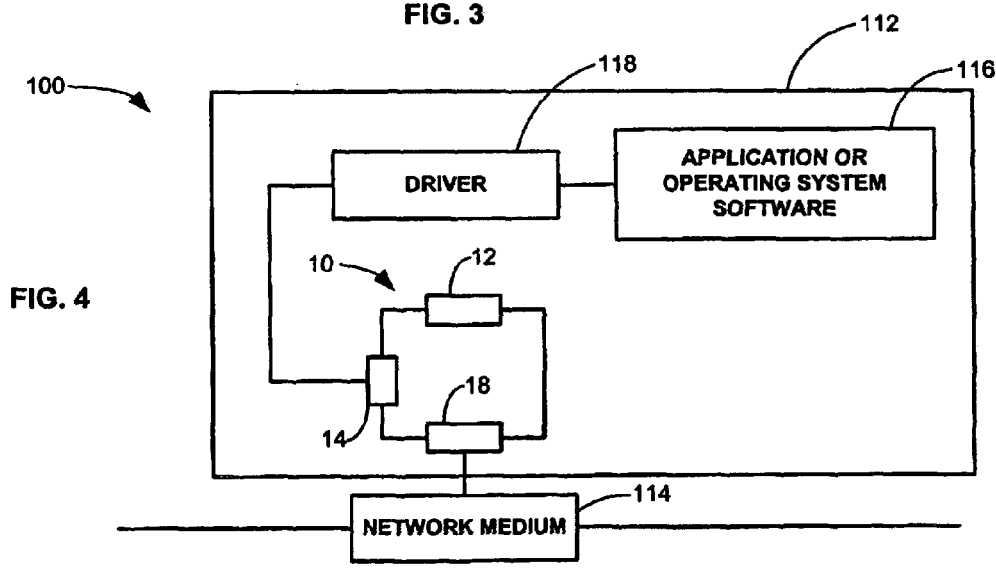

Turning now to FIGS. 3 and 4, two configurations are shown for attaching the interface device 10 to higher-level blocks and a network medium. In FIG. 3, a network node 50 includes the interface device 10 as a means for connecting a host, such as a host computer 52, to a network medium 54. In the host computer 52, data from operating system or application software 56 is received and processed by a software device driver arrangement 60.

The operating system or application software 56 creates data and notifies a network interface, for example using TCP/IP, that data is waiting to be sent to a specific node of the network. The network interface apparatus translates the destination node information into a destination address, reformats the data as necessary, and sends the data to the device driver arrangement 60 via a defined interface, for example via an interface following the NDIS (Network Driver Interface Specification) or ODI (Open Data-link Interface) specifications. The device driver arrangement 60 may reconfigure the data into a format compatible with devices downstream toward the network medium 54, and may create and add header information such as source and destination addresses, and data transmission speed. The device driver arrangement 60 may also divide data from the operating system or application software 56 into frames or packets of suitable length.

The frames or packets pass from the device driver arrangement 60 to a system MAC 64. The system MAC 64 may be part of a network interface card 66 which is installed in the host computer 52. The system MAC 64 may prepend or append additional information to packets received from the device driver arrangement 60. For example, the system MAC 64 may calculate and append some form of frame check sequence (FCS), such as a cyclic redundancy check (CRC), to the frames or packets.

The system MAC 64 includes a system MAC media independent interface (MII) 70, operably coupled to the corresponding MII 12 on the interface device 10. The MIIs 12 and 70 are capable of passing data and other information between the system MAC 64 and the interface device 10. The system MAC 64 may also be coupled, via the system MAC MII 70, to a legacy or system physical layer device (PHY) 76, the legacy PHY being configured for interfacing a network medium of a type different than the network medium 54.

The terms "media independent interface" and "MII" as used herein, are intended to include external interface connections which are variations on the standard MII, such as the reduced media independent interface (RMII) and the serial media independent interface (SMII).

The software device driver arrangement 60 and the interface device 10 have the capability of exchanging control or other information by the use of special packets or frames. These special packets or frames are configured to pass through the system MAC 64, without a loss of the control information or other data. Toward this end the software device driver arrangement 60 includes a system MAC device driver 78 and an intermediate driver 80. The system MAC device driver 78 is a device-specific driver designed for interfacing with the application or operating system software 56 and the system MAC 64 to allow communication between the operating system and the system MAC. The system MAC device driver 78 thus functions as part of the system to produce suitably-formatted data received from a network through the legacy PHY 76 and passed through the system MAC 64.

The intermediate driver 80 is a device-specific driver as regards the interface device 10. However, the intermediate driver 80 may be device-independent regarding the system MAC 64. That is, the intermediate driver 80 may be compatible with a variety of system MACs and system MAC device drivers. It performs the function of interfacing with the interface device 10, and properly formatting and passing along data to be sent and received by the network medium interface device. The intermediate driver 80 may appear "transparent" to the application or operating system software 56 and the system MAC device driver 78. That is, the application or operating system software 56 may operate as if it is interfacing directly with the system MAC device driver 78, and the MAC device driver may operate as if it is interfacing with the application or operating system software.

Control information may be passed between the control block 30 of the interface device 10, and the intermediate driver 80, via special frames or packets which are of a form that they pass unobtrusively through the intervening parts of the network node 50, such as the system MAC device driver 78, and the system MAC 64. The special frames or packets may have the format corresponding to that of a data frame or packet which would be transmitted or received by the network node 50. Thus the special frames or packets may have fields which correspond to the fields in a data frame or packet, for example information in fields corresponding to a destination address, a source address, a length and/or type of the frame, etc. The control information in the special frames or packets may be in the same position as data or payload is within a normal frame or packet. The control information in a special frame or packet sent from the intermediate driver 80 to the network medium interface device 10 may contain a series of register addresses and register contents, the control information being used to alter registers of a component of the interface device 10. For example, the control information in the special frame may have the same form as that of control information from an EEPROM, and may be routed to an EEPROM or a device that is coupled to an EEPROM.

The special frames or packets include identifiers which allow the part of the network node 50 which is the desired destination of the special frame, either the intermediate driver 80 or the control block 30, to detect the special frames from among the normal data frames passing through the interface device 10. The identifier may be a unique address in the source and/or destination address fields of the special frame. The identifiers for the special frames may use an otherwise unused IEEE address as a source or destination address. Alternatively, the special frames may utilize the IEEE address of the network interface card 66 or the interface device 10 as a destination address for special frames sent by the intermediate driver 80, and/or as a source address for special frames sent by the interface device 10. Another alternative identifier involves the special frame having a source address and a destination address which are the same. It will be appreciated that the control block 30 and the intermediate driver 80 may be configured to detect the foregoing identifiers.

The control information in the special packets may include various kinds of information for internal use within the network node 50. For example, the control information may include information regarding what transmit rates are to be used in transmitting data; information regarding the existence, identification, or capabilities of other network nodes; information regarding control of output drive characteristics (edge rate control on the network); and/or information regarding the internal operation of the network interface, including control information indicating the receipt of other special frames. The control information may be stored at its destination, for example in memory registers of the interface device 10 or the host computer 52.

It will be appreciated that the intermediate driver 80 includes some or all of the functions of gathering, storing, and communicating information on network topology, which were described above with regard to the node discovery block 28. Thus the intermediate driver may gather node capability information from frames received by the interface device 10 and passed to the intermediate driver 80. Also, node capability information may be gathered from capabilities and status announcement (CSA) frames which may be sent by other nodes to provide information about that node and/or about the network topology. CSA frames may be broadcast frames, may be sent at specified intervals, and may include information about the capabilities of the sending node (e.g., the rate at which the node is capable of transmitting and receiving, and/or the capability or lack thereof for specified enhanced operation features), the mode of operation of the sending node, and the network topology perceived by the sending node.

The intermediate driver 80 may be coupled to a suitable memory device, for example RAM, for storing the information about the network topology. The memory device may be a part of the host computer 52.

The intermediate driver 80 may be configured to append network topology information to frames to be transmitted. For example, the intermediate driver 80 may append or otherwise add information to a transmit frame regarding whether the first PHY 21 or the second PHY 22 is to be used to transmit the frame, the data rate at which the frame is to be transmitted, and/or regarding whether the first MAC 41 or the second MAC 42 is to be used to monitor the network medium and control transmissions.

The intermediate driver 80 may also send to the control block 30 control information regarding operation of the node discovery block 28, and/or control information regarding selection of one of the MACs 41 and 42 as the active MAC. Thus the intermediate driver 80 may send signals to the control block 30 to write a, bit to a memory indicating a mixed network topology, for example. The intermediate driver 80 may also or alternatively send a signal to the control block 30 to disable some or all of the functions of the node discovery block 28, for example to allow the disabled functions to be performed solely by software. Such control information may be sent from the intermediate driver to the control block 30 via special frames.

Alternatively, it will be appreciated that the control block 30 may be configured to detect the presence of the intermediate driver 80, and to disable some or all of the functions of the node discovery block 28 upon detection of the intermediate driver 80. The method of detecting the intermediate driver 80 may include sending special frames between the control block 30 and the intermediate driver.

It will be appreciated that the configuration of the network node 50 shown in FIG. 3 and described above is merely exemplary, and that the network node 50 may have a different configuration if desired. For example, the intermediate driver 80 may alternatively be placed between the system MAC device driver 78 and the system MAC 64. Alternatively, the device drivers 78 and 80 may be replaced by a single driver, if desired.

It will be appreciated that the network medium 54 may be wiring for telephone lines, or alternatively (with suitable modifications to the interface device 10) be any of a variety of well known media, such as fiber-optic cables or various types of dedicated metal-wire cables, for instance, such as twisted, shielded pair, or 10 BASE-T. Alternatively, the network medium may include wireless communication.

Turning now to FIG. 4, a network node 100 is shown which also includes the interface device 10 described above. The network node 100, which may be part of a host computer 112, includes application and/or operating system software 116, and a software driver 118 coupled to the application software. The software driver 118 is coupled to the PCI 14 of the interface device 10, for example via a bus of the host computer 112. The network medium interface device 10 is operatively coupled to a network medium 114, which may be of the same type as the network medium 54 described above.

It will be appreciated that the software driver 118 may also be configured to perform some or all of the functions of the node discovery block 28, if desired. In such a case, the software driver 118 may send control signals or information to the control block 30, for example to partially or completely disable the node discovery block 28.

FIG. 5 is a high-level flow chart, showing the conceptual framework of a method 140 for selecting one of the MACs 41 and 42 to be an active MAC in controlling access to the network medium. In step 142, information on other nodes of the network, such as the capabilities of the nodes, is gathered or updated. The data is used in step 144 to determine topology of the network. Then, in step 146, an active MAC to monitor the network medium is selected, based at least in part on the network topology. Thereafter the method is shown as repeating by returning to the step 142, indicating that the determination of the network topology, and thus the active MAC selection process, may be essentially continuously updated.

FIG. 6 is also a high-level flow chart, showing the conceptual framework of a method 150 for the selection of an active PHY, from among the PHYs 21 and 22, to transmit a frame from the interface device 10 onto the network medium. In step 152, information on other nodes of the network is gathered or updated. This step may be identical to the step 142 of the method 140, and it will be appreciated that the same node capability information may be used for both methods. In step 154 the node capability information is stored. Then, in step 156, the stored node capability information is used in selection of a PHY as the active PHY for transmitting an outgoing data frame or packet. The indicated return of the method to step 152 indicates that the node capability information may be essentially continuously updated.

The methods illustrated in FIGS. 5 and 6 may be performed in either hardware or software, for example utilizing either the node discovery block 28 or the intermediate driver 80.

Figure 7:
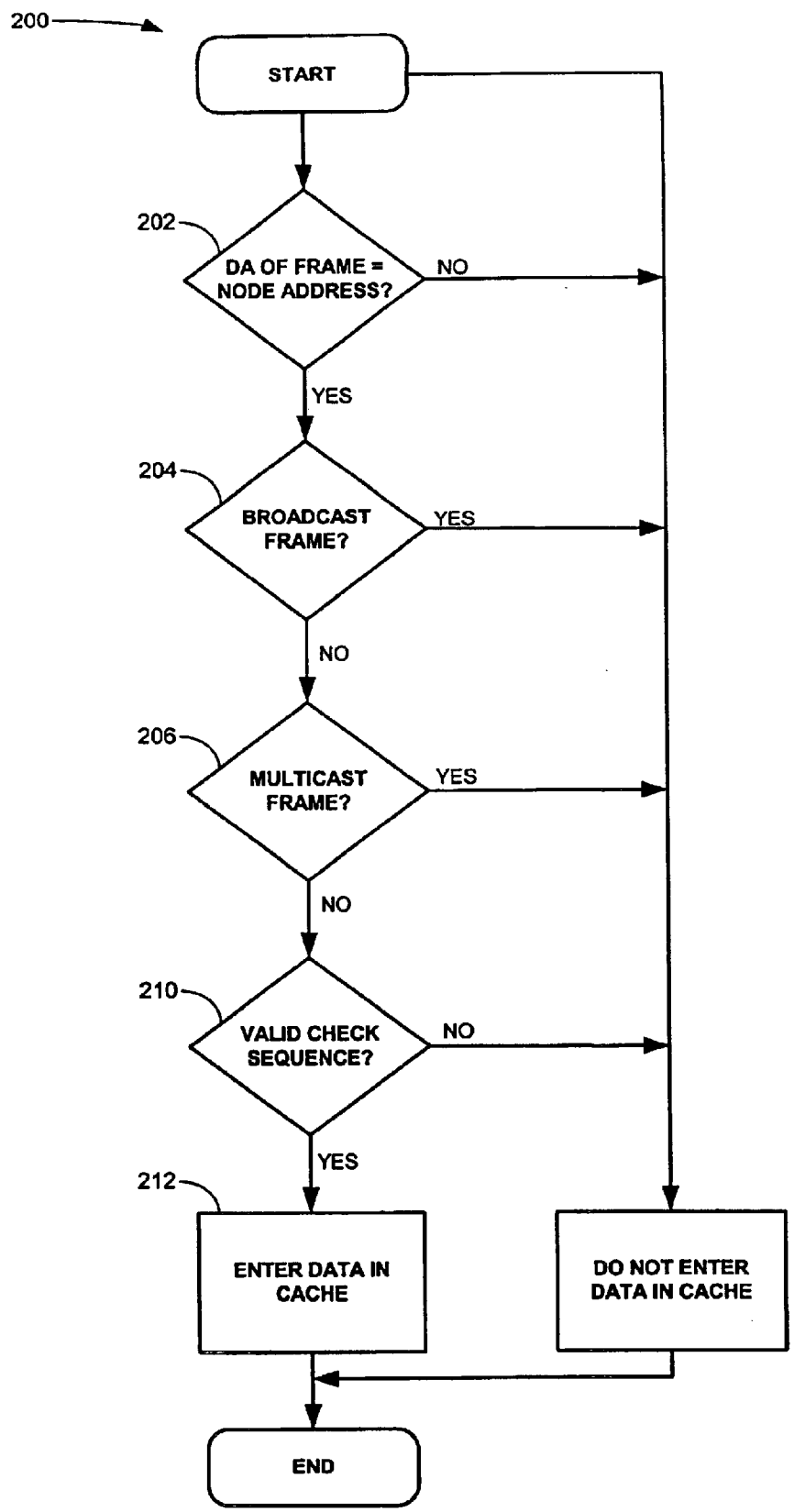
FIG. 7 is a flow chart of some steps of a method of gathering node capability information using the node discovery block of FIG. 2.

FIG. 7 is a highlevel flow chart of a method 200 to gather node capability information from frames received by the interface device 10, in which the node capability information is gathered by the node discovery block 28, in conjunction with the receive processing block 26.

In step 202 of the method, the destination address, (DA) of the received frame is examined by the frame examination sub-block 44 to see if the DA is the same as the address of the node that the interface device 10 is part of. If not, then the received frame is intended for reception by another node, and no node capability information is gathered from the frame (the node capability information from the frame is not entered into the cache 45 maintained by the node discovery block 28).

If the received frame is intended for the node the interface device 10 is a part of, then in steps 204 and 206 the received frame is checked to see if it is a broadcast or multicast frame. If the received frame is either a broadcast or multicast frame, then no node capability information is gathered from the frame, since such a frame may not be indicative of the full capabilities of the sending node.

In step 210 the received frame is examined to determine if its check sequences are valid. Verifying the validity of the frame may include checking one or more frame check sequences (FCSs) such as cyclic redundancy checks (CRCs) and/or header check sequences (HCSs). The verification of the validity of the frame may be performed by either the receive processing block 26 or by the frame examination sub-block 44 of the node discovery block 28. Alternatively, some or all of the verification may be performed by the PHYs 21 and 22 as the frame is received.

If the received frame is determined in step 210 to have valid check sequences, then the node capability information regarding the sending node is extracted in step 212 and forwarded for storage, by the storage sub-block 46, in the cache 45. The extraction of the node capability information may include examining a field of the received frames. For example, the node capability information may include the type of node that sent the received frame, and the determining whether the received frame is from an HPNA 1.0 only node or an HPNA 2.0 capable node may include examination of a field in the received frame which has a nonzero value only for transmissions from HPNA 1.0 only nodes. The examination of such a field fig may be performed by the frame examination sub-block 44. Alternatively, the examination of the field may be performed by the receive processing block 26 or the PHYs 21 and 22, with the results forwarded to the node discovery block 28.

Figure 8:
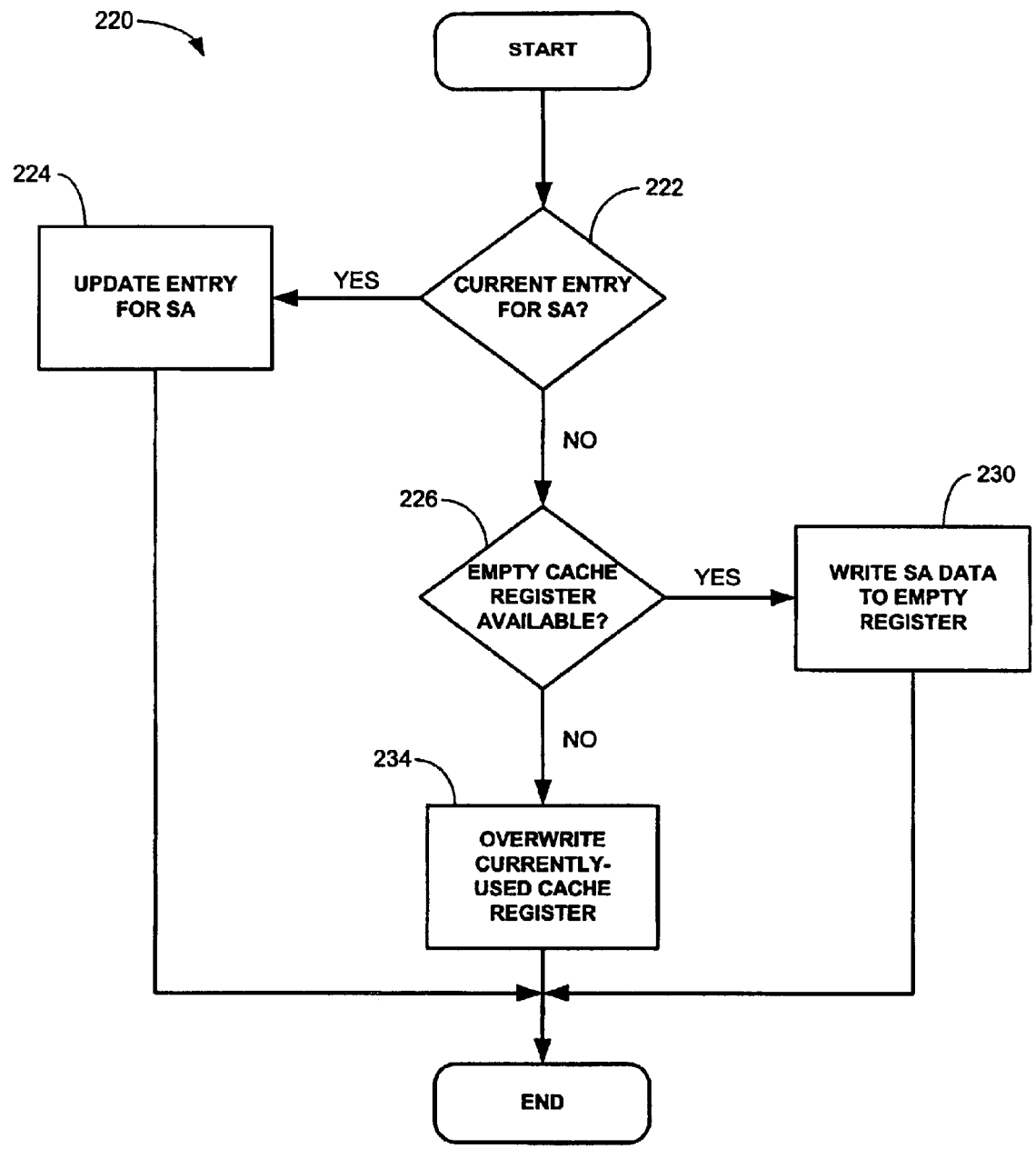
FIG. 8 is a flow chart of some of the steps of a method of storing node capability information in a cache of the node discovery block of FIG. 2.

FIG. 8 is a high-level flow chart of a method 220 to store the node capability information in the cache 45 of the node discovery block 28, by the storage sub-block 46 of the node discovery block. In step 222, the storage sub-block 46 examines the cache 45 to determine if there is a current entry in the cache corresponding to the node source address (SA) of the node which sent the received frame. If so, the cache entry corresponding to the SA is updated in step 224 by writing the newly-acquired node capability information over the old node capability information.

If there is no current entry in the cache 45 which corresponds to the SA, then the storage sub-block 46 looks for an empty cache register in step 226. If an empty register exists, the SA and the node capability information are written to the empty register in step 230. If no empty register exists, the SA and the node capability information are overwritten onto a currently-used cache register in step 234. The currently-used register to be overwritten may be selected on a least-recently used (LRU) basis. That is, the cache entry (register) least recently updated is the one overwritten. Alternatively, the cache register to be overwritten may be selected on a random basis. Or the cache register to be overwritten may be selected using a fixed replacement scheme, for example with the overwriting occurring in a fixed order, such as by register number.

Entries in the cache 45 may be received by the file retrieval sub-block 47 in response to queries from the transmit processing block 32. The transmit processing block 32 may send a query to the file retrieval sub-block 47, for example when node capability information is needed to choose a PHY to transmit a frame. The query may be in the form of all or a portion of a node address (such as destination address of a frame to be transmitted) asserted or presented on one or more pins of an interface between the transmit processing block 32 and the node discovery block 28, and a signal asserted on the interface indicating the presence of the node address information. The file retrieval sub-block 47 may then retrieve (capture the node address, and check the cache 45 for an entry corresponding to that node address. If there is such an entry in the cache 45, the file retrieval sub-block 47 retrieves the corresponding node capability information from the cache, thereafter forwarding the node capability information to the transmit processing block 32. In addition, the node discovery block 28 may send or assert a CACHE_HIT signal to the transmit processing block 32 to indicate that node capability information was found and forwarded in response to the query. If no node capability information is found for the node queried, then the node discovery block 28 may send or assert a CACHE_MISS signal to the transmit processing block 32. It will be appreciated that a single LOOKUP_DONE signal may instead be asserted by the node discovery block 28 to the transmit processing block 32, whether or not a corresponding entry was found in the cache 45. In such a case, the presence or absence of node capability information on the interface between the node discovery block 28 and the transmit processing block 32, would signal whether or not an entry was found in the cache 45 that corresponded to the node address sent in the query.

The node address identified in the query may be that of an intended destination node for a frame to be transmitted. The node capability information returned in a query may be used to select which of the PHYs 21 and 22 is used to transmit the frame along the network medium, such as by the transmit processing block 32 asserting a signal directly to one or both of the PHYs 21 and 22, or by the in, transmit processing block attaching or imbedding the information in the frame to be transmitted. It will be appreciated that one of the PHYs may be designated as the default PHY to handle transmissions when there is no information in the cache 45 corresponding to the intended destination node.

The node capability information gathered by the node discovery block 28 may also be used to determine the topology of the network. For example, the node discovery block may make a determination as to whether there are any HPNA 1.0 only nodes in the network. The determination may be made by utilizing the node capability information gathered and/or stored by the node discovery block 28. The result may be output as a MIXED_NET signal, which may be set to TRUE if an HPNA 1.0 only node is detected, and may be set to FALSE if no such nodes are detected. The signal may be asserted or otherwise sent to the control block 30, where it may be stored in a control register, and may be accessed for use in determining which of the MACs 41 and 42 is an active MAC for monitoring and controlling access to the network medium. In addition the MIXED_NET value may be used in the determination as to which of the PHYs 21 and 22 to use in transmitting frames. For example, the topology of the network as embodied in the MIXED_NET value may be used in selection which of the PHYs 21 and 22 will be used for transmitting multicast or broadcast frames.

The determination of the network topology may be made by a variety of methods and method steps. For example, the value of the MIXED_NET variable may be made by periodically examining the entries in the cache 45. If one or more of the entries has node capability information corresponding to an HPNA 1.0 only node, then the MIXED_NET is set to TRUE; otherwise, MIXED_NET is set to false. Alternatively, the node discovery block 28 may be configured to assert MIXED_NET as TRUE whenever a received frame is detected which both 1) meets the criteria for entry of its node capability information into the cache 45 (e.g., sent to the node that includes the node discovery block 28, not a broadcast or multicast frame, and has valid check sequence); and 2) has node capability information corresponding to an a HPNA 1.0 only node. The node discovery block 28 may include a timeout function to de-assert MIXED_NET=TRUE (set MIXED_NET as FALSE) if no HPNA 1.0 only node is detected over a specified time period (which may be represented as a number of clock cycles).

It will be appreciated that other methods of determining the network topology are possible. It will further be appreciated that other sorts of network topology types may be determined, for example involving multiple types of topologies defined by various combinations of the capabilities of nodes on the network.

The network topology information, such as the MIXED_NET value, may be used to select which of the MACs 41 and 42 is to be the active MAC. The selection of the active MAC may be made in the control block 30, with an enable or disable signal asserted or sent to one or both of the MACs 41 and 42. A change in the MIXED_NET value may also be used as a trigger for sending frames to other nodes on the network announcing the perceived change in topology.

It will be appreciated that some or all of the above-described functions of the node discovery block 28 may alternatively or in addition be performed (with suitable modification) by software, for example by the intermediate driver 80 shown in FIG. 3 and described above. As an alternative to or in addition to obtaining node capability information from received data frames intended for the node, the software may obtain node capability information from capability and status announcement (CSA) frames, for example the CSA frames described in the HPNA 1.0 specification, section 2.0.6. CSA frames, as described in section 2.0.6, are broadcast frames periodically sent out by HPNA 2.0 nodes on the network. The CSA frames described in section 2.0.6 include fields indicating the sending node's capabilities, such as what version of the HPNA specification it supports, what data rates it is capable of sending/receiving at, what enhanced capabilities it is capable of, etc. It will be appreciated that many variants of the above-described CSA frames may be employed.

Node capability information and/or network topology information may be sent from the intermediate driver 80 to the interface device 10 by means of special frames or packets, and/or by appending or embedding information in frames to be transmitted on the network medium.

Software which performs node discovery functions may be configured to send a signal to disable operation of the node discovery block 28. Such a node discovery block disable signal may be sent, for example, from the intermediate driver 80 to the control block 30 using the special frames or packets described above. The control block 30 may assert or send a signal disabling some or all of the operations of node discovery block 28. It will be appreciated that many alternative means are possible for selectively disabling some or all of the operations of the node discovery block 28. For example, the control block 30 may be configured to automatically disable the node discovery block 28 whenever a connection is made to the interface device 10 via the MII 12, thereby indicating the presence of an intermediate software driver which performs the node discovery and network topology determination functions.

The interface device 10 may be configured to set the MIXED_NET as TRUE upon startup. This allows any HPNA 1.0 only nodes that are present to detect the presence of the node, which may not happen if MIXED_NET is set to FALSE upon startup. An initial timeout function may be provided, for example in the node discovery block 28, that prevents the MIXED_NET from being changed to FALSE until some specified amount of time (some specified number of clock cycles) has passed.

Figure 9:
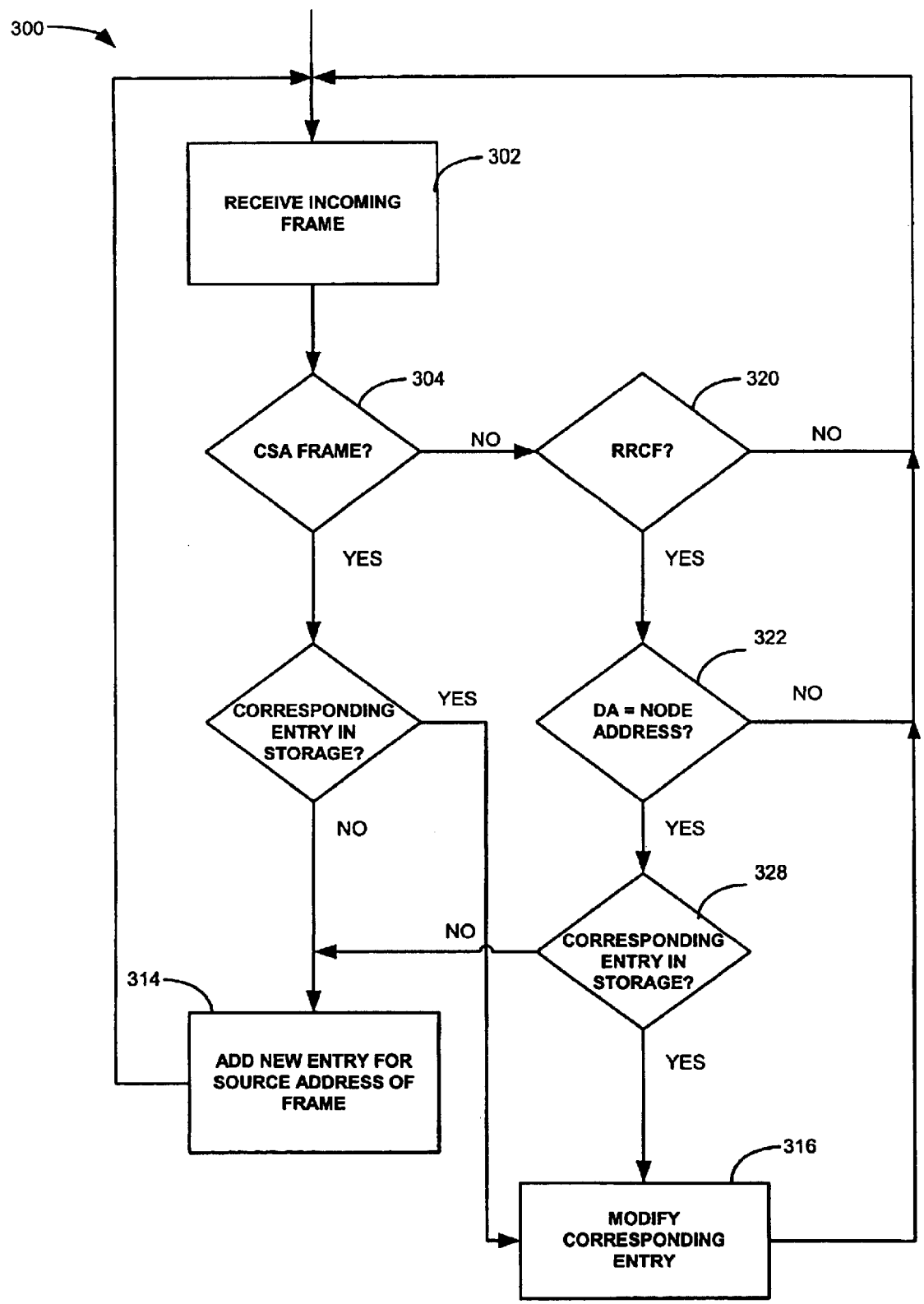
FIG. 9 is a flow chart of some of the steps of a method of the present invention of gathering and storing information transmit rate information regarding the transmission rate for frames to be transmitted to specific other nodes of the network.

FIG. 9 is a high-level flow chart of a method 300 to gather desirable transmission rate information from frames received by the interface device 10. The method 300 may be performed either before or after the method 200 described above. The transmission rate information may be gathered by the node discovery block 28, in conjunction with the receive processing block 26.

After an incoming frame is received in step 302 of the method, in step 304 the frame is examined to determine if the frame is a capability and status announcement (CSA) frame. If the incoming frame is a CSA frame, a check is made to determine if there is an entry, corresponding to the source node of the incoming frame, in a look-up table 310 (FIG. 10) stored in a storage device, which is maintained to store desirable transmission rate information for frames to be transmitted by the device. The look-up table 310 has a number of entries 312, each of the entries corresponding to another node of the network, and each of the entries including the address of the corresponding node and a desirable transmission rate for frames to be sent to that node. The look-up table 310 may be maintained as part of the cache 45. Alternatively, the look-up table 310 may be maintained in a different storage device.

If the look-up table 310 does not contain an entry corresponding to the source address (SA) of the incoming frame, an entry corresponding to the sending node of the incoming frame is added in step 314. The look-up table 310 is first examined for an empty cache register. If an empty entry register exists, the SA and the desirable transmission rate are written to the empty register. It will be appreciated that the desirable transmission rate information may be extracted from the incoming frame by examining an appropriate field of the incoming frame, for example. The desirable transmission rate information may be a desirable transmission rate. Alternatively, a desirable transmission rate may be determined from the desirable transmission rate information.

If no empty entry register exists, the SA and the desirable transmission rate information are overwritten onto a currently-used entry. The currently-used entry register to be overwritten may be selected on a least-recently used (LRU) basis. That is, the cache entry (register) least recently updated is the one overwritten. Alternatively, the cache register to be overwritten may be selected on a random basis. Or the cache register to be overwritten may be selected using a fixed replacement scheme, for example with the overwriting occurring in a fixed order, such as by register number.

If the look-up table 310 does contain an entry corresponding to the SA of the incoming frame, then the corresponding entry is updated in step 316.

If the incoming frame is not a CSA frame, then an examination is made in step 320 to determine if the incoming frame is a rate request control frame (RRCF). If not, then no desirable transmission rate information is extracted from the incoming frame, and receipt of the next incoming frame is awaited. If the incoming frame is an RRCF, then the frame is examined in step 322 to see if its destination node (DA) is the same as the current node's address. That is, a determination is made as to to whether the received RRCF is intended for this node, or for another node. If the RRCF is not intended for this node, then no desirable transmission rate information is extracted from it, and receipt of the next incoming frame is awaited.

If the incoming frame is an RRCF intended for this node, desirable transmission rate information is extracted from the RRCF and in step 328 a determination is made as to whether a corresponding entry exists in the look-up table 310. If not, an entry corresponding to the sending node of the incoming frame is added in step 314, as described above. If so, the entry is modified (updated) in, step 316, also as described above.

It will be appreciated that some or all of the steps of the method 300 may alternatively or in addition be performed (with suitable modification) by software, for example by the intermediate driver 80 shown in FIG. 3 and described above.

Desirable transmission rate information may be sent from the intermediate driver 80 to the interface device 10 by means of special frames or packets, and/or by appending or embedding information in frames to be transmitted on the network medium.

It will further be appreciated that the look-up table 310 may be utilized in determining the transmission rate of outgoing frames sent by the interface device 10. The look-up table may be examined for an entry corresponding to the destination address of an outgoing frame. If such a corresponding entry exists, then the desirable transmission rate information of that entry is used to set the transmission rate of the outgoing frame. If an entry corresponding the DA does not exist in the look-up table 310, then a default transmission rate may be used in transmitting the frame.

Although the above description has stressed a particular embodiment of the invention, it will be appreciated that the above-described interface device and methods may, with suitable modifications, be applied to a wide variety of network devices, and/or may be applied to obtain, store, and/or utilize information regarding a wide variety of network node capabilities and/or network topologies.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of setting a sending transmit rate for transmitting an outgoing data frame from a network node along a network which includes telephone wiring as a network medium, the method comprising:

receiving incoming frames from other nodes;

extracting, from each of at least some of the incoming frames, both a source node address corresponding to a source node of an incoming frame, and a desirable transmission rate for transmitting data between the network node and the source node;

storing, in a storage device at the network node, a look-up table with multiple entries, each of the entries including a node address and a corresponding desirable transmission rate extracted from each of the at least some of the incoming frames; and determining the sending transmit rate for an outgoing frame sent to a destination node having an outgoing frame destination address, the determining the sending transmit rate for the outgoing frame including:

comparing the outgoing frame destination address to node addresses stored in the storage device to determine whether a corresponding entry exists in the storage device which corresponds to the outgoing frame destination node;

if the corresponding entry exists, setting the sending transmit rate equal to the corresponding desirable transmission rate of the entry, wherein the network node includes a network medium interface device which includes at least two Physical Layer Devices (PHYs), the PHYs having different operating characteristics; and controlling selection of an active PHY from among the PHYs based on capabilities of the outgoing frame destination node to which the frame is to be transmitted.

2. The method of claim 1, wherein the determining includes, if the corresponding entry in the storage device does not exist, setting the sending transmit rate equal to a default rate.

3. The method of claim 1, further comprising communicating the sending transmit rate to one or more physical layer devices of the network node.

4. The method of claim 1, wherein the extracting includes determining whether the incoming frame is a specialized capability announcement frame, and extracting the desirable transmission rate from specialized capability announcement frames.

5. The method of claim 1, wherein the storing includes examining the entries in the storage device to determine if a corresponding entry is present in the storage device, which corresponds to the source node address of a respective one of the incoming frames from which the desirable transmission rates were extracted.

6. The method of claim 5, wherein the storing includes, if the corresponding entry is present, updating the corresponding entry.

7. The method of claim 6, wherein the storing includes, if the corresponding entry is not present, adding a new entry or replacing an existing entry.

8. The method of claim 1, wherein the extracting includes determining whether the incoming frame is a capability and status announcement (CSA) frame, or is a rate request control frame (RRCF) with a RRCF destination address corresponding to the network node, and extracting desirable transmission rates from the CSA frames and the RRCFs with a RRCF destination address corresponding to the network node.

9. The method of claim 8, further comprising communicating the sending transmit rate to one or more physical layer devices of the network node.

10. The method of claim 9, wherein the determining includes, if the corresponding entry in the storage device does not exist, setting the sending transmit rate equal to a default rate.

11. The method of claim 10, wherein the storing includes examining the entries in the storage device to determine if a corresponding entry is present in the storage device, which corresponds to the source node address of a respective one of the incoming frames from which the desirable transmission rates were extracted.

12. The method of claim 11, wherein the storing includes, if the corresponding entry is present, updating the corresponding entry.

13. The method of claim 12, wherein the storing includes, if the corresponding entry is not present, adding a new entry or replacing an existing entry.

* * * * *

UNITED STATES PATENT AND TRADEMARK OFFICE
CERTIFICATE OF CORRECTION

PATENT NO. : 6,912,199 B1
DATED : June 28, 2005
INVENTOR(S) : Chin-Wei Liang

It is certified that error appears in the above-identified patent and that said Letters Patent is hereby corrected as shown below:

Column 3,
Line 42, replace "further-process" with -- further process --.

Column 4,
Line 10, replace "HPNA 1.0 and 1.0" with -- HPNA 1.0 and 2.0 --.
Line 59, replace "The,Macs" with -- The MACs --.

Column 6,
Line 9, replace "70,operably" with -- 70 operably --.

Column 9,
Line 26, replace "highlevel" with -- high-level --.
Line 32, replace "address, (DA)" with -- address (DA) --.
Line 54, replace "Altematively," with -- Alternatively, --.
Line 58, replace "information-regarding" with -- information regarding --.

Column 10,
Line 3, replace "a field fig may" with -- a field may --.
Line 26, replace "Altematively," with -- Alternatively, --.

Column 11,
Line 5, replace "the in, transmit" with -- the transmit --.
Line 45, replace "an a HPNA" with -- an HPNA --.

Column 12,
Line 7, replace "HPNA 1.0" with -- HPNA 2.0 --.

UNITED STATES PATENT AND TRADEMARK OFFICE
CERTIFICATE OF CORRECTION

PATENT NO. : 6,912,199 B1
DATED : June 28, 2005
INVENTOR(S) : Chin-Wei Liang

It is certified that error appears in the above-identified patent and that said Letters Patent is hereby corrected as shown below:

Column 13,
Line 22, replace "Alternatively," with -- Alternatively, --.
Line 38, replace "as to to whether" with -- as to whether --.
Line 49, replace "in, step" with -- in step --.

Signed and Sealed this

Sixth Day of September, 2005

JON W. DUDAS
*Director of the United States Patent and Trademark Office*